(12) United States Patent
Fisher et al.

(10) Patent No.: US 6,388,351 B1
(45) Date of Patent: May 14, 2002

(54) BEARING LOAD WASHER

(75) Inventors: Lynn Edwin Fisher; Marc D. Pape, both of Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/564,006

(22) Filed: May 3, 2000

Related U.S. Application Data

(60) Provisional application No. 60/173,849, filed on Dec. 30, 1999.

(51) Int. Cl.[7] .............................. H02K 5/00; F16B 21/18
(52) U.S. Cl. ............................ 310/91; 310/90; 411/521
(58) Field of Search .............................. 310/90, 91, 42, 310/71, 89, 67 R; 73/862.331, 862.336; 411/545–547, 520–521, 517, 160–162; 267/160, 162–166, 165, 158, 180–182; 29/596–598; 360/99.08, 99.07, 98.08, 98.07, 99.12

(56) References Cited

U.S. PATENT DOCUMENTS

| | | | | |
|---|---|---|---|---|
| 4,035,040 A | * | 7/1977 | Yarris ......................... 384/495 |
| 4,560,014 A | | 12/1985 | Geczy | |
| 4,641,551 A | * | 2/1987 | Pascaloff ..................... 475/263 |
| 4,729,675 A | | 3/1988 | Trzeciak et al. | |
| 4,752,178 A | * | 6/1988 | Greenhill ..................... 411/521 |
| 4,786,834 A | * | 11/1988 | Grant et al. ................. 310/194 |
| 4,836,794 A | * | 6/1989 | Barr ........................... 439/135 |
| 4,992,686 A | * | 2/1991 | Heine et al. .............. 310/49 R |
| 5,008,572 A | * | 4/1991 | Marshall et al. .............. 310/90 |
| 5,074,681 A | | 12/1991 | Turner et al. | |
| 5,166,565 A | | 11/1992 | Katsuzawa et al. | |
| 5,168,188 A | | 12/1992 | Yamamoto et al. | |
| 5,364,194 A | | 11/1994 | Lubin | |
| 5,392,178 A | * | 2/1995 | Nishio et al. .................. 310/90 |
| 5,455,471 A | | 10/1995 | Dowell | |
| 5,473,794 A | * | 12/1995 | Kobayashi .................... 16/337 |
| 5,606,475 A | * | 2/1997 | Ishizuka ................... 360/99.08 |
| 5,639,074 A | * | 6/1997 | Greenhill et al. ........... 267/162 |
| 5,765,950 A | | 6/1998 | Eno et al. | |
| 5,795,075 A | * | 8/1998 | Watson ........................ 384/215 |
| 5,806,169 A | * | 9/1998 | Trago et al. ................... 310/90 |
| 5,838,081 A | | 11/1998 | Greentaner et al. | |
| 5,957,589 A | | 9/1999 | Lee et al. | |
| 6,069,768 A | | 5/2000 | Heine et al. | |
| 6,152,603 A | | 11/2000 | Iwasaki | |
| 6,250,618 B1 | * | 6/2001 | Greenhill ..................... 267/162 |

FOREIGN PATENT DOCUMENTS

| | | | |
|---|---|---|---|
| JP | 411159802 A | * | 6/1999 |
| JP | 2000037069 | * | 2/2000 |

* cited by examiner

*Primary Examiner*—Tran Nguyen
(74) *Attorney, Agent, or Firm*—Karl Vick, Esq.; Damian Wasserhauer, Esq.; Armstrong Teasdale LLP

(57) ABSTRACT

A bearing load washer that permits assembly of electric motors with the rotor shaft in a vertical position and extending downward is described. The bearing load washer includes a plurality of portions that form a non-planar, wave shaped, substantially circular shaped, washer body. The washer includes a center opening that is sized so that an electric motor rotor shaft can extend through the washer body. The washer includes an outer circumferential surface and at least one raised area extending radially from the outer circumferential surface. The raised areas are configured to increase the outside diameter of the washer so that the outer circumferential surface engages the inner surface of an endshield bearing pocket at each raised area of the outer circumferential surface.

15 Claims, 2 Drawing Sheets

BEARING LOAD WASHER

CROSS REFERENCE TO RELATED APPLICATIONS

This application claims the benefit of U.S. Provisional Application No. 60/173,849, filed Dec. 30, 1999.

BACKGROUND OF THE INVENTION

This invention relates generally to electric motors and more particularly, to bearing load washer for an electric motor.

Known electric motors typically include a motor housing, a stator, and a rotor assembly. The rotor assembly includes a rotor core and a rotor shaft extending through the core. The housing includes a shell and two endshields and houses at least a portion of the rotor assembly. Electric motors also include at least one bearing sized to receive the rotor shaft. Typically the bearings are positioned in endshield bearing pockets. The endshields attach to ends of the housing shell. For optimum operation of the motor, the bearings need to align with the rotor shaft, i.e., the center of the bearing cartridge opening needs to align with the centerline of the rotor shaft.

Usually a load washer is located in the endshield bearing pocket. The load washer is positioned to seat against the bearing outer race. Typically the load washer is sized to loose fit in the endshield bearing pocket to allow radial/diametrical growth when the washer is compressed. If a loose fit is not provided, the washer can pack down into the bearing pocket and not return to its natural seat against the outer race of the bearing. However, during an assembly process with the motor shaft in a vertical downward position and the load washer in the top endshield bearing pocket, a loose fit load washer falls out of the endshield producing an assembly defect.

It would be desirable to assemble electric motors in a vertical shaft down mode with the load washer in the top endshield pocket and not have the washer fall out of the endshield during assembly.

BRIEF SUMMARY OF THE INVENTION

A bearing load washer in an exemplary embodiment of the present invention permits assembly of electric motors with the rotor shaft in a vertical position and extending downward. The bearing load washer includes a plurality of portions that form a non-planar, substantially circular shaped, washer body. The plurality of portions form a wave pattern. This wave shaped washer is sometimes referred to as a wave washer.

The washer body includes a center opening sized so that an electric motor rotor shaft can extend through the opening. The washer body includes an outer circumferential surface and at least one raised area extending radially from the outer circumferential surface. The raised areas are configured to increase the outside diameter of the washer so that the outer circumferential surface engages the inner surface of an endshield bearing pocket at each raised area of the outer circumferential surface. The engagement of the outer surface raised areas with the inner surface of the endshield bearing pocket permits the endshield to be turned upside down with the bearing washer remaining in the bearing pocket of the endshield. Because the bearing washer only engages the inner surface of the bearing pocket at the raised portions, there is still room between the outer surface of the washer and the inner surface of the bearing pocket to permit radial/diametrical growth when the washer is compressed.

The above described bearing load washer permits assembly of an electric motor in a vertical, downward extending shaft position. Particularly, a first endshield is positioned in a motor assembly fixture. Then a rotor core and rotor shaft subassembly with bearings at each end is positioned in the assembly fixture with the rotor shaft extending downward through the endshield and one bearing assembly positioned in the endshield bearing pocket. Next a stator and motor housing subassembly is positioned so that the rotor core extends through a stator bore and the housing engages the first endshield. Then the above described bearing load washer is positioned in the bearing pocket of a second endshield with the raised areas of the outer surface of the washer engaging the inner surface of the bearing pocket. The endshield and bearing washer assembly is inverted and then positioned on the motor so that the endshield engages the motor housing and the second bearing assembly is received in the bearing pocket of the second end shield with the bearing load washer engaging the outer race of the bearing. The endshields are then attached to the motor housing with bolts.

The above described bearing load washer permits assembly of an electric motor in a vertical, downward extending shaft position without the bearing load washer falling from the endshield. The raised areas of the outer circumferential surface of the washer provide a light press fit retention in the endshield bearing pocket without interfering with the function of the load washer.

DETAILED DESCRIPTION OF THE INVENTION

Figure 1:
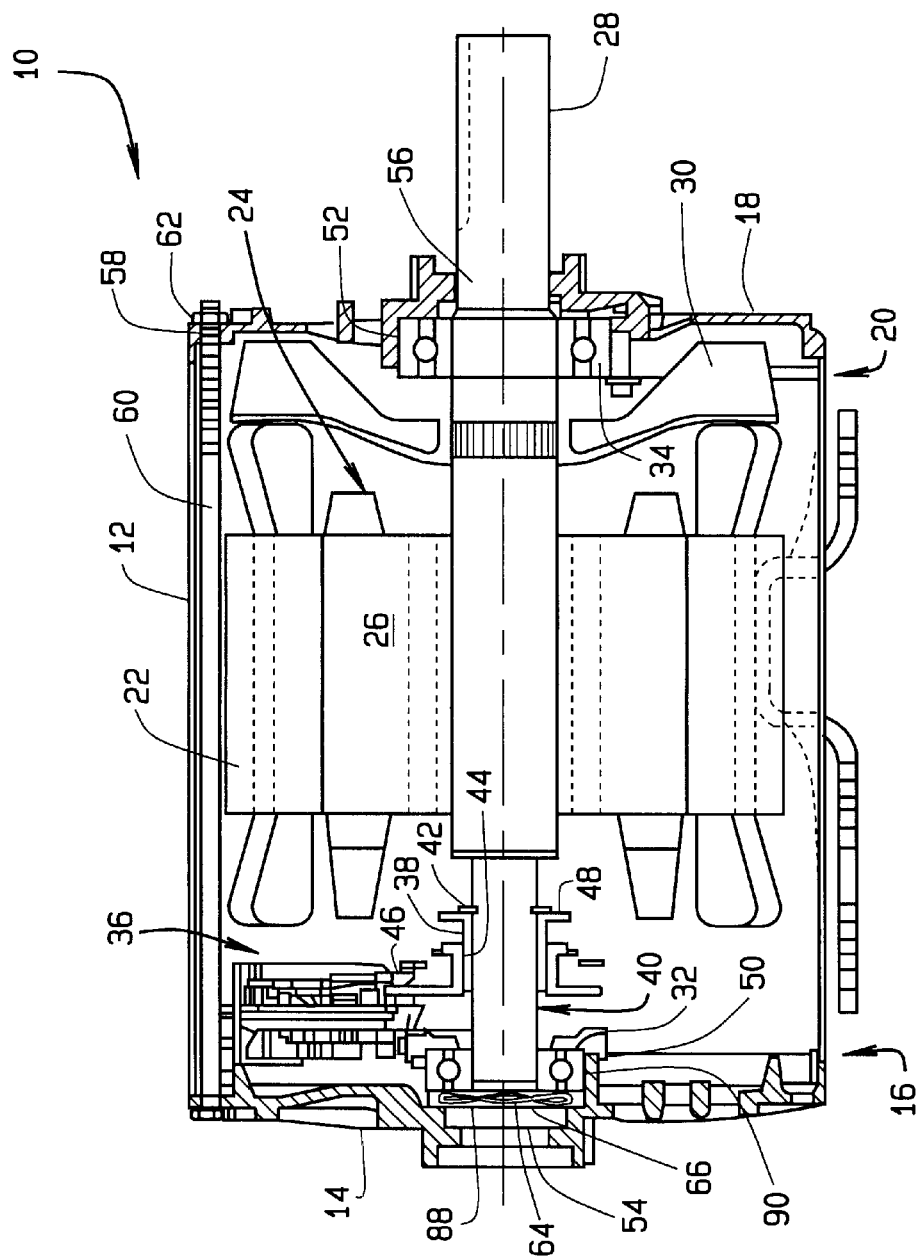
FIG. 1 is a sectional side view of an electric motor assembly in accordance with one embodiment of the present invention.

FIG. 1 is a sectional side view of an electric motor assembly 10 in accordance with an exemplary embodiment of the present invention. Motor assembly 10 includes a cylindrical motor housing 12, a first endshield 14 coupled to housing 12 at a first end 16, and a second endshield 18 coupled to housing 12 at a second end 20.

Motor assembly 10 also includes a stator 22 and a rotor assembly 24. Rotor assembly 24 includes a rotor core 26 and a rotor shaft 28 extending through rotor core 26. Rotor assembly 24 also includes a plurality of fan blades 30 coupled to rotor core 26 to cool the windings of stator 22. Shaft 28 is rotatably supported by bearings 32 and 34.

Stator 22 includes run windings (not shown) and start windings (not shown). The start windings, in combination with the run windings, are used to initiate rotation of rotor core 26 and rotor shaft 28. Once shaft 28 has attained sufficient rpm to achieve a normal running speed, the start winding is "cut-out" of the motor circuit so that the start winding does not adversely impact motor operation. A centrifugal switch mechanism 36 is used to cut-out a start winding (not shown) when rotor shaft 28 reaches a pre-set rotational speed. Centrifugal switch mechanism 36 includes a base collar 38 positioned on a first end 40 rotor shaft 28. Particularly, a retaining clip 42 is locked on rotor shaft 28 adjacent base collar 38 to prevent base collar 38 from sliding town the shaft towards rotor core 26. Centrifugal switch mechanism 36 also includes a push collar 44 configured to slide axially on base collar 38. Push collar 44 engages a switch arm 46. As rotor shaft 28 rotates push collar 44 moves axially along base collar 38 toward a flange 48 of collar 38 positioned adjacent retaining clip 44. The movement of push collar 44 causes switch arm 46 to move to the off position to cut-out the start winding (not shown).

First and second endshields 14 and 18 include bearing pockets 50 and 52 respectively. Bearing pockets 50 and 52 are sized to receive bearings 32 and 34 respectively. Additionally, endshields 14 and 18 include center openings 54 and 56 respectively. Center openings 54 and 56 are sized to permit rotor shaft 28 to extend through endshields 14 and 18. First and second endshields include a plurality of bolt openings 58 sized to receive clamp bolts 60. Endshields 14 and 18 are attached to motor housing 12 by clamp bolts 60. Particularly, each clamp bolt 60 extends through corresponding bolt openings 58 in first and second endshields 14 and 18. Clamp bolt nuts 62 secure clamp bolts 60 to endshields 14 and 18.

Figures 2, 3:
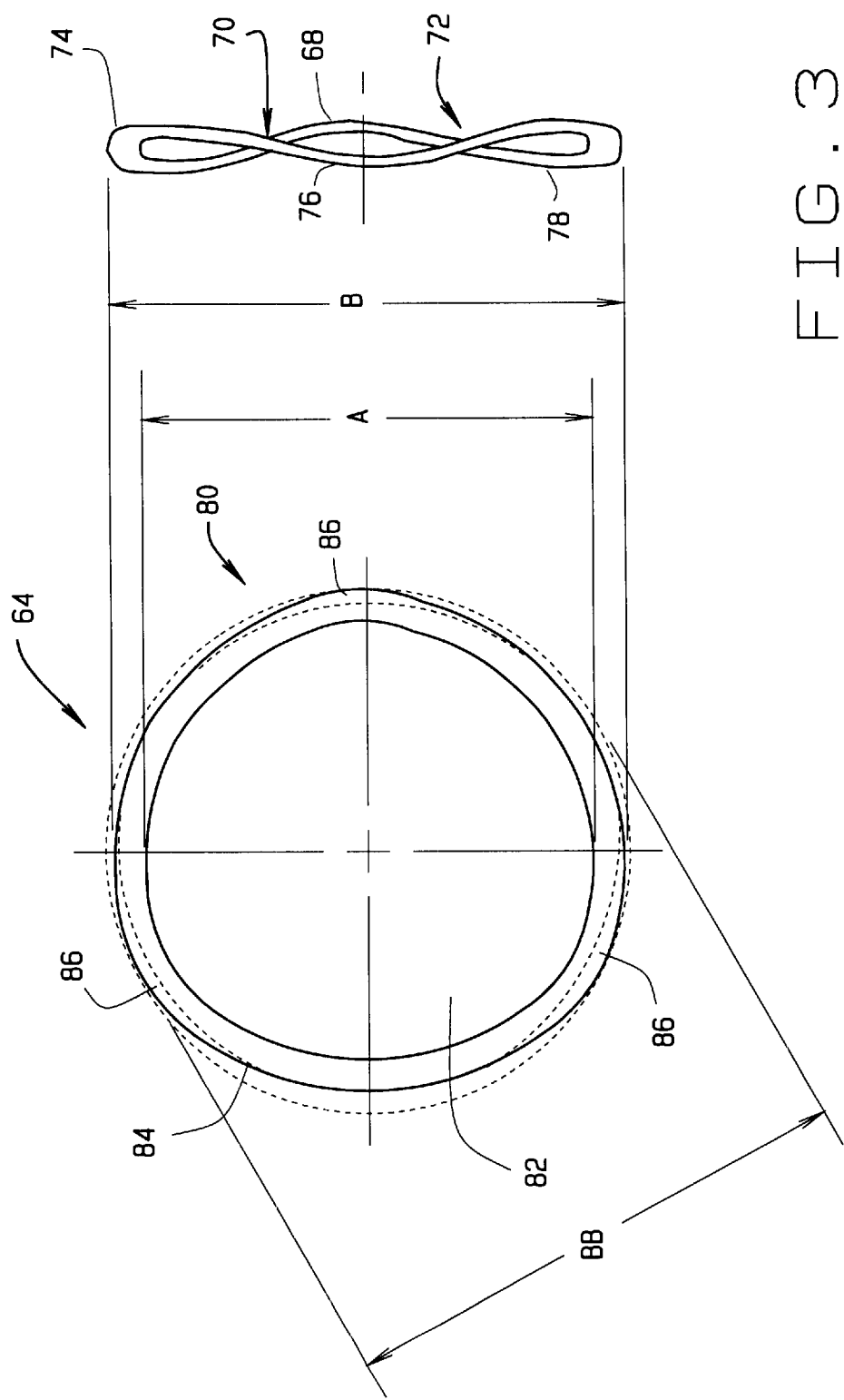
FIG. 2 is a top view of bearing load washer shown in FIG. 1.
FIG. 3 is a side view of the bearing load washer shown in FIG. 2.

Electric motor 10 also includes a bearing load washer 64 positioned in first endshield bearing pocket 50. Bearing thrust washer 64 is located between bearing 32 and the bottom 66 of bearing pocket 50. Referring to FIGS. 2 and 3, bearing load washer 64 includes a first portion 68 having a first end 70 and a second end 72, a second portion 74 extending from first end 70 of first portion 68, a third portion 76 extending from second portion 74, and a fourth portion 78 extending from third portion 76 to second end 72 of first portion 68. First, second, third, and fourth portions 68, 74, 76, and 78 form a washer body 80 having a substantially circular shape. First, second, third, and fourth portions 68, 74, 76, and 78 are non-planar and form a wave pattern. Wave shaped washer 64 is sometimes referred to as a wave washer.

Washer body 80 includes a center opening 82 having an inside diameter A sized so that rotor shaft 28 can extend through opening 82. Washer body 80 includes an outer circumferential surface 84 and three raised areas 86 extending radially from outer circumferential surface 84. Raised areas 86 are configured to increase outside diameter B of washer 62 to an increased outside diameter BB so that outer circumferential surface 84 engages an inner surface 88 (see FIG. 1) of second endshield bearing pocket 50 at each raised area 86. The engagement of outer surface raised areas 86 with inner surface 88 (FIG. 1) of endshield bearing pocket 50 permits endshield 14 to be turned upside down with bearing washer 64 remaining in bearing pocket 50 of endshield 14. Because bearing washer 64 only engages inner surface 88 (FIG. 1) of bearing pocket 50 with raised areas 86, there is still room between outer surface 84 of washer 62 and inner surface 88 (FIG. 1) of bearing pocket 50 to permit radial/diametrical growth when washer 64 is compressed.

The above described bearing load washer 64 permits assembly of electric motor 10 in a vertical position with rotor shaft 28 extending downward. Particularly, endshield 18 is positioned in a motor assembly fixture (not shown). Then rotor core 26 and rotor shaft 28 with bearings 32 and 34 at each end of shaft 28 is positioned in the assembly fixture with rotor shaft 28 extending downward through the endshield 18 and bearing 34 positioned in endshield bearing pocket 52. Next stator 22 and motor housing 12 are positioned so that rotor core 26 extends through a stator bore (not shown) and 12 housing engages endshield 18. Bearing load washer 64 is positioned in bearing pocket 50 of a endshield 14 with raised areas 86 of outer circumferential surface 84 of washer 64 engaging inner surface 88 (FIG. 1) of bearing pocket 50. Endshield 14 with bearing washer 64 is inverted and then positioned on motor 10 so that endshield 14 engages motor housing 12 and bearing 32 is received in bearing pocket 50 of the endshield 14 with bearing load washer 64 engaging the outer race 90 (see FIG. 1) of bearing 32. Endshields 14 and 18 are then attached to motor housing 12 and each other with clamp bolts 60 extending through corresponding bolt openings 58 in first and second endshields 14 and 18, and clamp bolt nuts 62.

The above described bearing load washer 64 permits assembly of electric motor 10 in a vertical position with rotor shaft 28 extending downward without bearing load washer 64 falling from endshield 14. Raised areas 86 of outer circumferential surface 84 of washer 64 provide a light press fit retention in endshield bearing pocket 50 without interfering with the function of load washer 64.

While the invention has been described and illustrated in terms of various specific embodiments, those skilled in the art will recognize that the invention can be practiced with modification within the spirit and scope of the claims.

What is claimed is:

1. A bearing load washer for an electric motor, the electric motor comprising an endshield, a bearing, and a rotor shaft, the endshield comprising a bearing pocket having an inner surface, the bearing pocket sized to receive the bearing, said load washer comprising:

a first portion having a first end and a second end;

a second portion extending from said second end of said first portion;

a third portion extending from said second portion;

a fourth portion extending from said third portion to said first end of said first portion, said first, second, third, and fourth portions forming a washer body having a substantially circular shape, said first, second, third, and fourth portions are non-planar;

an outer circumferential surface; and at least one raised area extending radially from said outer circumferential surface, said at least one raised area configured to increase an outside diameter of said washer so that said outer circumferential surface engages the inner surface of the bearing pocket at each raised area of said outer circumferential surface.

2. A washer in accordance with claim 1 further comprising a center opening configured so that the rotor shaft can extend through said washer body.

3. A washer in accordance with claim 2 comprising three raised areas extending radially from said outer circumferential surface.

4. A washer in accordance with claim 1 wherein said non-planer first, second, third, and fourth portions form a wave pattern.

5. An electric motor assembly comprising:

a motor housing;

a stator mounted in said housing and comprising a bore therethrough;

a rotor core rotatably mounted in said housing and extending through said stator bore;

a rotor shaft extending through said core;

a first endshield coupled to a first end of said motor housing, said first endshield comprising a bearing pocket sized to receive a first bearing assembly, said first bearing assembly sized to receive said rotor shaft;

a second endshield coupled to a second end of said motor housing, said second endshield comprising a bearing pocket sized to receive a second bearing assembly, said second bearing assembly sized to receive said rotor shaft; and a bearing load washer positioned in said first endshield bearing pocket, said bearing load washer comprising:
an outer circumferential surface; and
at least one raised area extending radially from said outer circumferential surface, said at least one raised area configured to increase an outside diameter of said washer so that said outer circumferential surface engages an inner surface of said bearing pocket of said first endshield at each raised area of said outer circumferential surface.

6. An electric motor assembly in accordance with claim 5 wherein said washer comprises:
a first portion having a first end and a second end;
a second portion extending from said second end of said first portion;
a third portion extending from said second portion; and
a fourth portion extending from said third portion to said first end of said first portion, said first, second, third, and fourth portions forming a washer body having a substantially circular shape, said first, second, third, and fourth portions are non-planar.

7. An electric motor assembly in accordance with claim 6 wherein said washer further comprises a center opening configured so that said rotor shaft can extend through said washer body.

8. An electric motor assembly in accordance with claim 6 wherein said washer comprises three raised areas extending radially from said outer circumferential surface.

9. An electric motor assembly in accordance with claim 6 wherein said non-planer first, second, third, and fourth portions form a wave pattern.

10. A method of assembling an electric motor assembly, the electric motor assembly comprising a motor housing, a stator, a rotor core, a rotor shaft extending through the core, a first endshield comprising a bearing pocket sized to receive a first bearing assembly, the first bearing assembly sized to receive the rotor shaft, a second endshield comprising a bearing pocket sized to receive a second bearing assembly, the second bearing assembly sized to receive the rotor shaft, and a bearing load washer comprising an outer circumferential surface and at least one raised area extending radially from the outer circumferential surface, the at least one raised area configured to increase an outside diameter of the washer so that the outer circumferential surface engages an inner surface of the bearing pocket of the first endshield at each raised area of the outer circumferential surface, said method comprising the steps of:

inserting the second endshield into a fixture configured to support the motor with the rotor shaft extending vertically and downward;
positioning the rotor so that the rotor shaft is in a vertical orientation and extends through the second endshield, the first and second bearing assemblies coupled to the rotor shaft;
positioning the motor housing and the stator so that rotor extends through the stator bore;
positioning the load washer inside the first endshield bearing pocket; and
positioning the first endshield so that the first bearing assembly is received in the first endshield bearing pocket by inverting the first endshield and placing the bearing pocket over the first bearing assembly.

11. A method in accordance with claim 10 wherein the bearing washer comprises a first portion having a first end and a second end, a second portion extending from the second end of first portion, a third portion extending from the second portion, and a fourth portion extending from the third portion to the first end of the first portion, the first, second, third, and fourth portions forming a washer body having a substantially circular shape, the first, second, third, and fourth portions are non-planar.

12. A method in accordance with claim 10 wherein the bearing washer further comprises a center opening configured so that the rotor shaft can extend through the washer body.

13. A method in accordance with claim 10 wherein the bearing washer comprises three raised areas extending radially from the outer circumferential surface.

14. A method in accordance with claim 11 wherein the non-planer first, second, third, and fourth portions form a wave pattern.

15. A method in accordance with claim 10 further comprising the step of coupling the first endshield, second endshield, and housing together with clamp bolts to form the motor assembly.

* * * * *